E. HOLMES.
TOWING AND HOISTING DEVICE.
APPLICATION FILED JUNE 4, 1921.
1,435,065.
Patented Nov. 7, 1922.
4 SHEETS—SHEET 4.
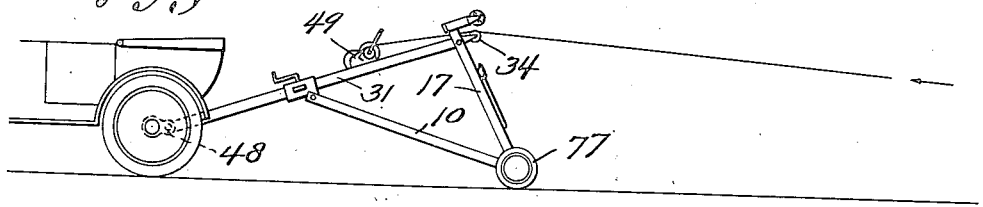
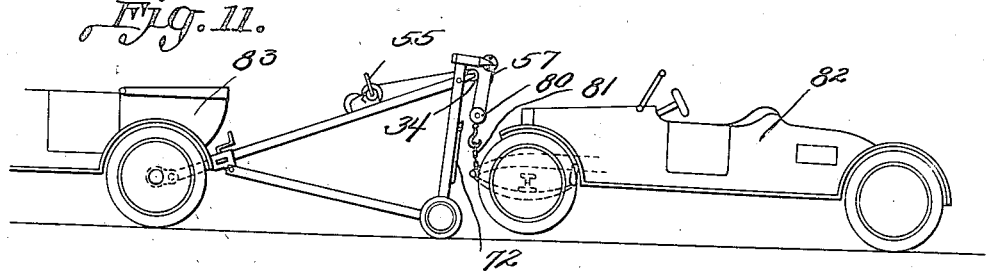
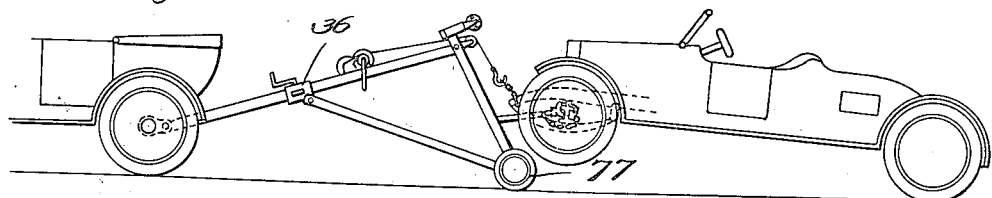
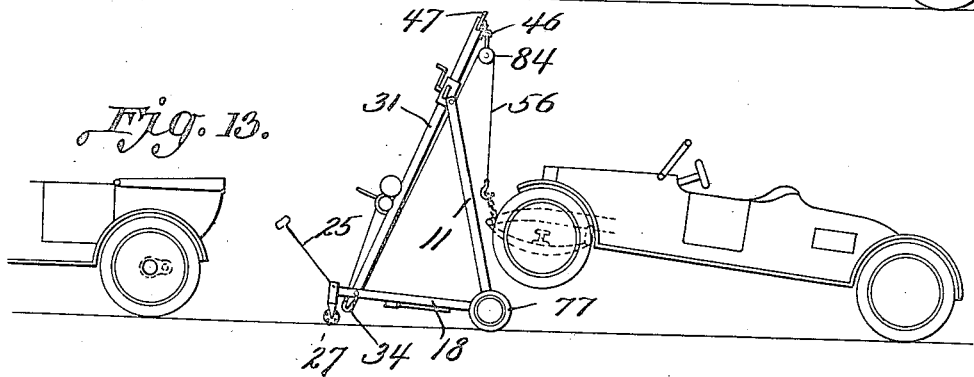

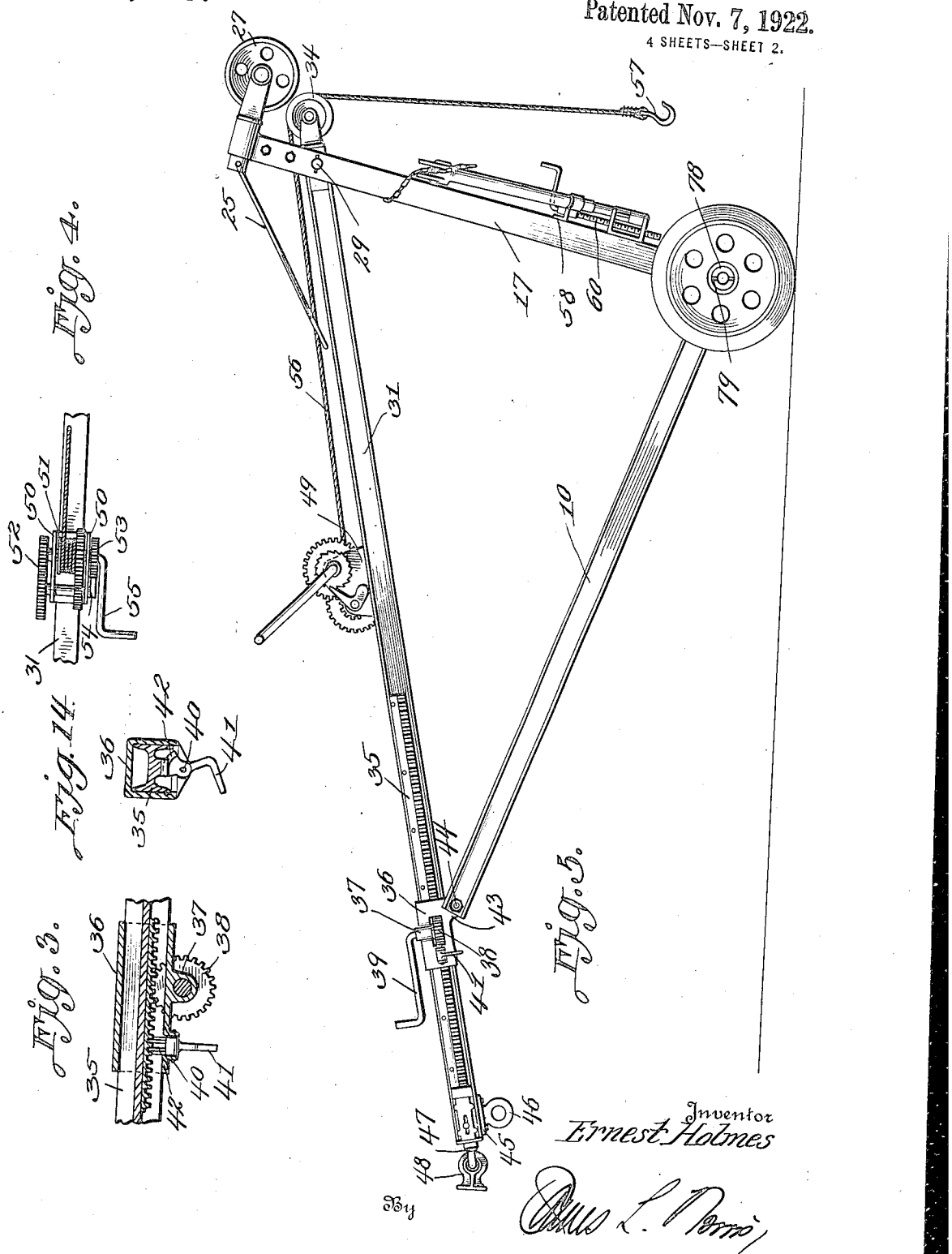

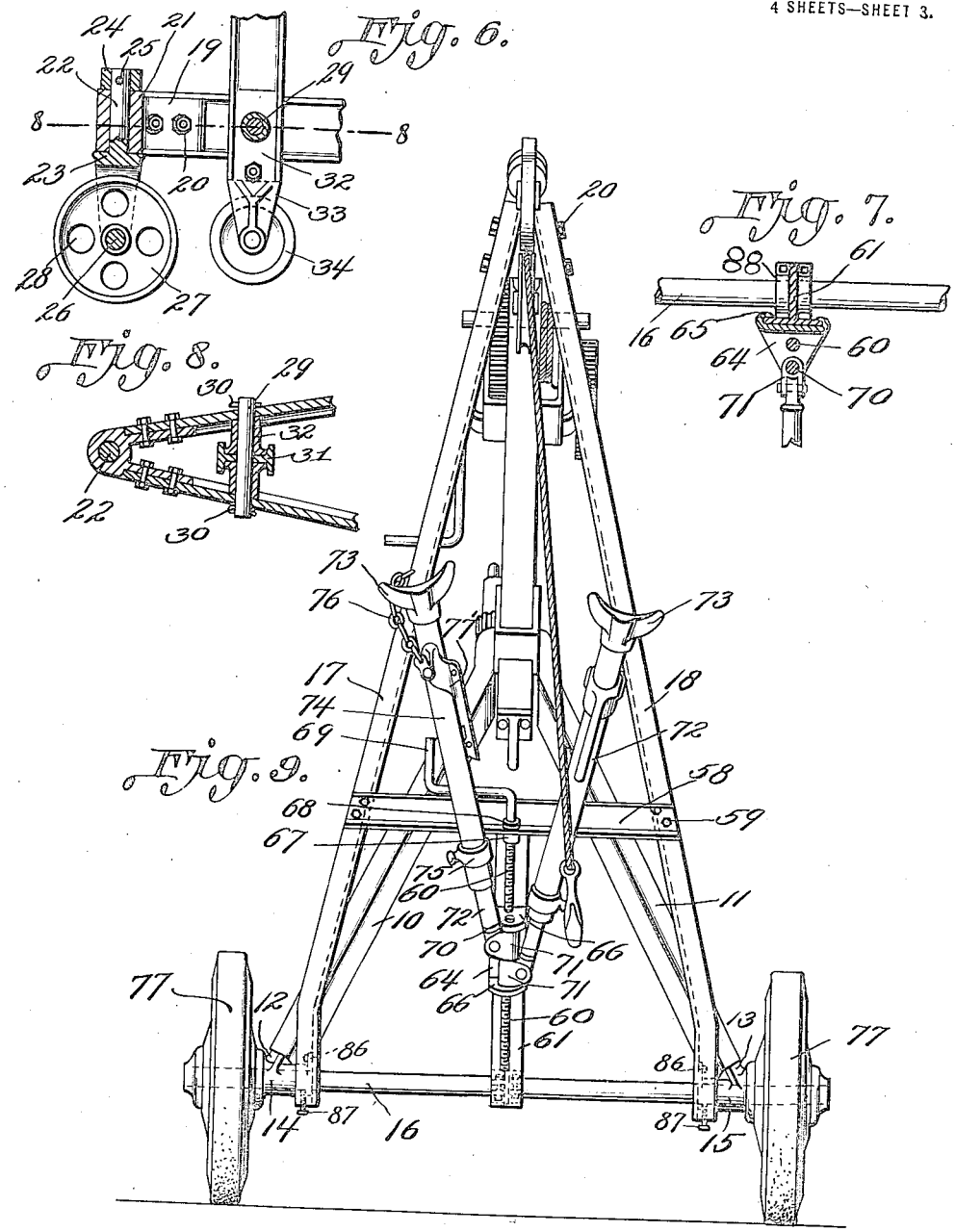

Patented Nov. 7, 1922.

1,435,065

UNITED STATES PATENT OFFICE.

ERNEST HOLMES, OF CHATTANOOGA, TENNESSEE, ASSIGNOR TO ERNEST HOLMES COMPANY, OF CHATTANOOGA, TENNESSEE, A CORPORATION OF TENNESSEE.

TOWING AND HOISTING DEVICE.

Application filed June 4, 1921. Serial No. 474,962.

*To all whom it may concern:*

Be it known that I, ERNEST HOLMES, a citizen of the United States, residing at Chattanooga, in the county of Hamilton and State of Tennessee, have invented new and useful Improvements in Towing and Hoisting Devices, of which the following is a specification.

This invention relates to towing devices for motor vehicles, commonly termed towing ambulances, and more especially to devices of this character employing hoisting features.

Equipment for towing wrecked or disabled vehicles frequently takes the form of specially constructed and equipped motor vehicles. These expensive outfits are kept on hand to respond to occasional calls of disabled, ditched or wrecked cars, and represents an investment that is not continuously yielding returns.

My invention aims to provide a device or ambulance independent of the structure of a motor vehicle, which can be economically manufactured and sold to the trade at a much less cost than a wrecking truck outfit, and which will at the same time be capable of performing all the functions of the latter.

Furthermore in order that the purchase of a device constructed in accordance with my invention may prove to be an investment of the highest economic efficiency, means are provided for converting the towing and wrecking mechanism into a portable hoist for use in the garage or shop. Thus there is no need for the device to lie idle while waiting for an emergency call.

The general nature and objects of the invention are stated above and I shall now proceed with a more detailed description, in connection with the accompanying drawings, from which other objects of the invention consisting of novel features of construction and arrangements of parts will become apparent.

In the drawings:—

Fig. 3 is a longitudinal section through the adjustable carriage of the device showing the means for locking the carriage in adjusted position.

Fig. 4 is a partial top plan view showing the windlass carried by the frame of the device and the crank for operating the same.

Fig. 5 is a side view showing the towing device in one of its adjusted positions.

Fig. 6 is a sectional view showing the swiveled roller bracket.

Fig. 7 is a sectional view, with parts broken away, showing the vertically adjustable slide and the mounting of one of the adjustable towing bars thereon.

Fig. 8 is a transverse section on the line 8—8 of Fig. 6.

Fig. 9 is an end elevation of the towing device showing the towing bars in folded position.

Fig. 10 shows diagrammatically the preferred adjustment of the towing device when traveling empty and when attempting to haul a car from a ditch to the road.

Fig. 11 shows the manner of supporting the disabled car upon the towing device.

Fig. 12 shows the preferred towing position with the device in balanced position.

Fig. 13 shows diagrammatically the use of the device as a hoist.

Fig. 14 is a cross sectional view through the sliding carriage showing the eccentric locking means.

Figure 1:
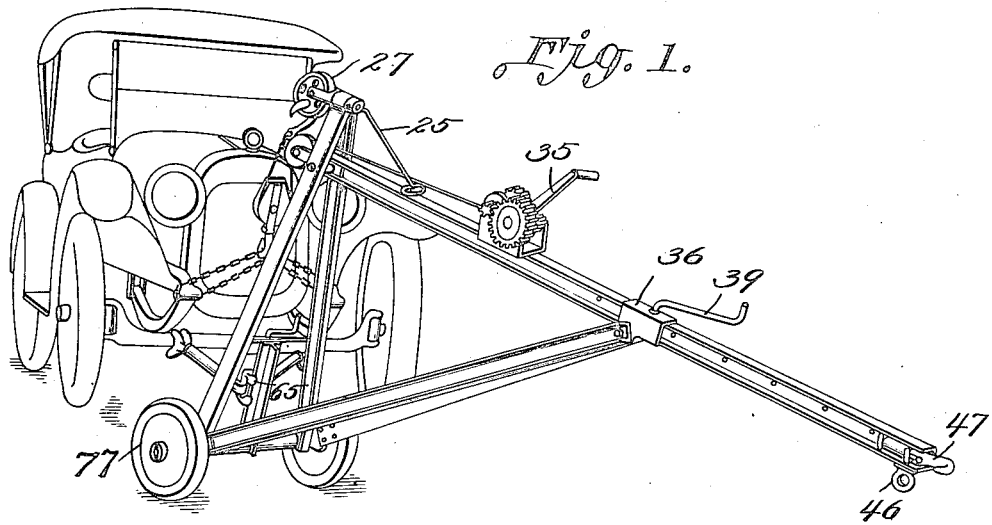
Fig. 1 is a perspective view showing the device in towing position and angularly displaced in regard to the vehicle in order to illustrate its flexibility in turning curves.

Generally speaking my device may be described, as comprising a plurality of triangular frames, having their bases mounted on the axle of the towing device, means for adjusting one of said triangular frames relatively to the other, towing bars adapted to be adjusted vertically and longitudinally, and a hoisting mechanism arranged in connection with the triangular frames.

One of the triangular frames consists of the side channels 10 and 11 the lower ends of which are secured to the angularly projecting webs 12 and 13 of brackets which are provided with sleeve portions 14, 15 adapted to freely surround the axle 16 of the device. The other triangle frame consists of the side channels 17 and 18 which are bent into parallel relation near one end and the webs of the channels are provided with suitable brackets 86 adapted to engage the axle 16 adjacent to the inner ends of the sleeves 14, 15 of the axle brackets. These brackets are provided with a set screw 87 by means of which the members 17 and 18 are secured fixedly to the axle. The upper or apex ends of the channel members 17, 18 as shown in Fig. 6 are connected together by a V-shaped bracket 19 the sides of which are secured to the webs of the respective frame members by means of bolts 20 or other suitable fastening devices. This bracket has a hole 21 formed transversely therethrough which is adapted to receive the shank 22 of a swiveled bracket 23. The shank 22 is retained in the bracket by a suitable washer 24 and the bent end of a rod 25 which passes through the washer and shank. The swiveled bracket 23 is bifurcated at one end and these bifurcations are suitably apertured for receiving a journal pin 26 on which is mounted a wheel 27 provided with lightening holes 28 through its web. Just below the bracket 19 holes are formed in the webs of the channel members 17 and 18 and through these holes a pin 29 is passed, this pin being retained in position in any suitable manner as by cotter pins 30.

An I-beam 31 is provided at one end with brackets 32 spaced for receiving the web of the I-beam. Bosses project outwardly from the spaced portions of the bracket 32 and these bosses are bored so as to align with an aperture of the web of the beam for receiving the pin 29, whereby the I-beam 31 is pivotally mounted at one end on this pin. The brackets 32 are provided with a bifurcated extension 33 in which is journalled a pulley 34. Near the other end of the I-beam is secured a rack 35. A carriage 36 comprising a rectangularly bent plate adapted to slide upon the flanges of the I-beam 31 is provided with a boss 37 in which is journalled a pinion 38 adapted to engage the teeth of the rack 35 and to be operated by the crank handle 39, whereby the longitudinal position of the carriage may be varied within the limits of the rack. The rectangularly bent plate is also provided with a pin 40 on which is pivotally mounted a sector 42, having curved teeth eccentric to the axis of rotation engageable with the teeth of the rack 35 to lock the carriage in adjusted position. This sector is provided with an operative handle 41. The lower side of the carriage is provided with downwardly projecting lugs 43 having an apertures adapted to align with apertures in the apex ends of the frame members 10 and 11, and a bolt 44 passing through these apertures pivotally secures the converging ends of these channel members to the carriage 36. By adjusting the carriage 36 along the beam 31, these frame members 10 and 11 will move the axle 16 rearwardly and the frame members 17, 18 will move pivotally about the pin 29. The I-beam 31 extends beyond the rack 35 and has secured to the lower flange thereof a bracket 45 formed with an eye or loop 46 the purpose of which is to support the end of the beam clear of the ground and provide means for easily moving the device when this end rests upon the ground thereby protecting a snap hoop 47 which is secured to the web of the beam and is adapted to engage through an eye of a bracket 48 secured to the towing vehicle. On the top flange of the I-beam 31 and preferably about midway of the length of the beam is fixed a member 49 having spaced uprights 50 in which are journalled the driving shafts of a windlass having the drum 51 and reduction gearing designated 52 mounted on these shafts, a ratchet wheel 53 and pawl 54, and an operating crank arm 55. A cable 56 is secured at one end to the drum and is adapted to pass over the pulley 34 and is equipped at its free end with a hook 57 for a purpose which will hereinafter appear.

The beams 17 and 18 are intermediately connected by a structural angle 58 which is secured thereto by bolts or rivets 59. The outstanding arm of this angle is provided with an aperture through which passes an elevating screw 60. The structural angle 58 is connected to the rear axle 16 by means of a T member 61 the stem of which is suitably apertured for receiving the rear axle. The apertured end of member 61 is provided with clamping brackets 88 secured thereto on either side which surround the axle and are clamped thereto holding the axle against rotation. The frame members 17, 18 and 61 are thus retained on the rear axle against lateral displacement. On the flange of the T member 61 is slidably mounted a bracket 64 having clips 65 engaging over the T-head. This bracket is formed with spaced lugs 66 provided with aligning apertures suitably threaded for receiving the threaded rod 60. The upper end of the rod 60 is made plain and has secured thereto spaced collars 67, 68 which retain the rod against longitudinal displacement in the projecting arm of the tie angle 58. The upper end of this screw threaded rod is provided with a crank handle 69 whereby the rod may be conveniently rotated for raising or lowering the bracket 64.

The lugs 66 are also provided with a second series of aligning apertures adapted to receive a pivot pin 70 on which are mounted the sleeves 71 of adjustable towing bars 72. These towing bars may be of suitable construction but I prefer the form of towing bar shown and described in my copending application Serial No. 437,942 filed Jan. 17, 1921, which shows the spring pressed towing head 73 mounted in the tubular casing 74 which is adjustable on the bar 72 by means of the spring pressed locking device 75. A chain 76 is secured at one end to a pivoted locking means 77' and the chain is adapted to pass around the axle or some other part of the disabled vehicle and have its other end locked by the locking means 77' so as to bind the towing head 73 against the axle and hold the same tightly in position. These towing arms are preferably secured near opposite ends of the axle as shown in Figure 1, so as to prevent oscillation of the vehicle being towed. The ends of the rear axle 16 extend beyond the brackets 14 and 15 and have rotatably mounted thereon the wheels 77 which are preferably retained in place by means of the slotted ring castings 78 and a pin 79 passing through the slot of each of said castings and engaging a transverse aperture through said shaft. The bracket sleeves 14, 15 in conjunction with the bracketed ends of the members 17 and 18, and the ring castings 78 hold the wheels in proper place and protect their bearings from grit and dirt.

In towing the ambulance to the scene of the wreck, the carriage 36 is preferably adjusted to the upper extremity of the rack as shown in Figure 10, as this position lowers the center of gravity and gives a longer wheel base, thereby reducing any tendency of the apparatus to turn over while being towed to the destination. If a car has been ditched the carriage 36 is left in the same adjustment and the ambulance is placed in favorable position to pull the ditched car back on the road by means of the cable 56 and the windlass. For this purpose the snap hook 47 may be retained in engagement with the bracket 48 of the car or the hook may be disconnected from the car and anchored in any suitable manner to a tree or post, or it may be anchored by driving a shaft into the ground through the eye of the snap hook. The cable 56 may be attached directly to the ditched car by means of the hook 57 or the hook 57 may be inserted through one of the openings 28 in the wheel 27 and a pulley block 80 may be placed in the cable between the wheel 27 and pulley 34, and a suitable cable is then attached to the pulley block and the ditched car in order to secure more leverage, in case the cable 56 cannot be readily wound upon the drum of the windlass through the ordinary reduction gearing 52.

Figure 2:
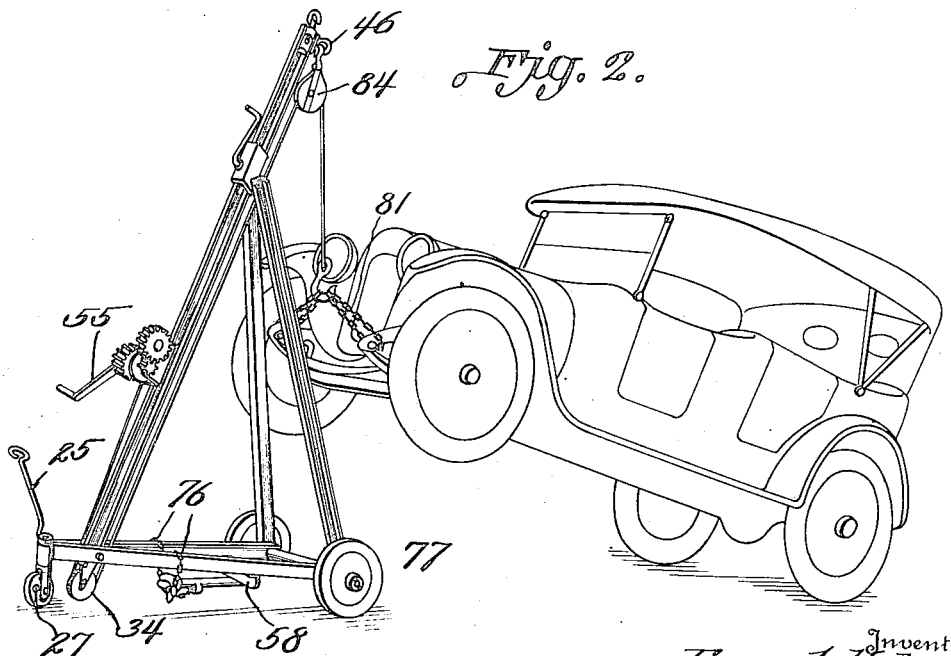
Fig. 2 is a perspective view illustrating the device being used as a hoist.

After the ditched vehicle has been pulled on the road in the manner above described, the ambulance is adjusted to the position shown in Figure 11 in which chains 81 are secured to the hook of the pulley block 80 and to the springs of the disabled vehicle 82 whereupon the crank arm 55 of the windlass is operated to swing the front wheels of the vehicle clear of the ground. In the position shown in Figure 11 the tendency, due to the weight of the disabled vehicle is to lift up the rear end of the towing car 83, but by releasing the adjusting lock 41 and revolving crank 39 until it comes to a neutral position, the carriage 36 will assume a balanced position in which this tendency is overcome and the wheels 77 are placed practically under the center of gravity of the load. It is obvious that by continuing the movement of the crank beyond its neutral point the load may be placed so as to exert a downward force against the rear end of the towing car 83. Before the ambulance is thus placed in balanced or towing position the towing bars are put in place being adjusted vertically by means of the elevating rod 60, and longitudinally by means of the locking devices 75. Then the adjustment locks are put in place and the chains 76 are locked about the front axle of the disabled vehicles as shown in Figures 10, 11 and 12. After the ambulance has been put in towing position and the vehicle towed to the garage or shop the ambulance is disconnected therefrom and its position altered so that it rests upon the wheels 77 and the wheel 27. The swiveled bracket supporting the wheel 27, as above described is provided with a rod 25 by which the hoist may be moved to different parts of the shop, and this rod is formed with hook-shaped handle which may be conveniently grasped, and in towing position this handle is retained in place by the cable 56 which passes through the handle as shown in Figure 5. With the ambulance arranged as a hoist as shown in Figures 2 and 13, a suitable pulley and hook 84 is secured to the eye 46 and the cable 56 passing over the pulleys 34 and 84 is adapted to engage the chains 81 secured to the front springs of the vehicle, and by operating the handle 55 of the windlass this cable may be wound upon the drum 50 and thus the vehicle may be raised to any desired position and retained in this position while suitable repair work is being performed.

From the above description it is believed apparent that applicant has provided a towing device of simple and inexpensive construction which is adapted to act as a hoist in shop repair work. By thus combining towing, wrecking and hoisting features in a single device, applicant has invented a wrecking ambulance, the selling price of which may be within the reach of even the smaller shops and which is adapted to render efficient service, inasmuch as it may be employed either for shop or road work.

It will be understood, however, that the particular construction described and shown has been chosen for illustrative purposes merely and that the invention as defined by the claims hereunto appended, may be otherwise embodied and applied without departing from the spirit and scope thereof.

Having described my invention what I claim as new and desire to secure by Letters Patent, is:—

1. A device of the class described comprising a frame adapted to assume different positions for towing and hoisting operations, and different bases of support for carrying the frame in said towing and hoisting operations respectively.

2. A device of the class described, comprising a frame, and wheels for supporting the frame in hoisting position, some of said wheels being inoperative when the frame is disposed in towing position.

3. A device of the class described comprising an adjustable frame, wheels for supporting the frame in hoisting position, some of said wheels being inoperative when the frame is disposed in towing position, and means for adjusting the frame for varying the supporting base when the frame is arranged for towing.

4. A device of the class described comprising an axle, triangular frames having the side members thereof mounted on said axle in spaced relation, a beam pivotally connected to the apex end of one of said frames, and means for adjustably connecting the apex end of the other of said frames to said beam.

5. A device of the class described comprising an axle, triangular frames having the side members thereof mounted on said axle in spaced relation, a beam pivotally connected to the apex end of one of said frames, a carriage adjustably mounted on said beam, and means pivotally connecting the apex end of the other of said frames to said carriage.

6. A device of the class described comprising an axle, triangular frames having the side members thereof mounted on said axle in spaced relation, a beam pivotally connected to the converging sides of one of said frames, a carriage slidably mounted on the beam, means pivotally connecting the converging sides of the other of said frames to said carriage, and devices for locking the carriage in adjusted position.

7. A device of the class described comprising an axle, triangular frames having the side members thereof mounted on said axle in spaced relation, a beam pivotally connected to the apex end of one of said frames, means for adustably connecting the apex end of the other of said frames to the beam, a pulley pivotally mounted at one end of said beam, and a windlass secured to said beam having a cable adapted to pass over said pulley.

8. A device of the class described comprising an axle, triangular frames having the side members thereof mounted on said axle in spaced relation, a beam joining the apex ends of said frames, a pulley pivotally mounted at one end of said beam, means at the other end for connecting said beam to the towing vehicle, and a windlass mounted on the beam having a cable passing over said pulley adapted to be attached to the disabled vehicle.

9. A device of the class described comprising an axle, triangular frames having the side members thereof mounted on said axle in spaced relation, a beam pivotally connected to the apex end of one of said frames, means for adjustably connecting the apex end of the other of said frames to the beam, a pulley pivotally mounted at one end of said beam, means at the other end for connecting said beam to the towing vehicle, and a windlass mounted on the beam having a cable passing over said pulley adapted to be attached to the disabled vehicle.

10. A device of the class described comprising an axle having a pair of wheels mounted thereon, a triangular pyramidal frame mounted on said axle, said frame having a base provided with a wheel at the vertex opposite said axle for supporting the frame in conjunction with the pair of wheels when in hoisting position, and means at the apex of the frame adapted to be connected to the towing vehicle whereby the frame when in towing position is supported by said pair of wheels and said means.

11. A device of the class described having a pyramidal frame, wheels for supporting the base of said frame when the latter is disposed in hoisting position, and means at the apex for connecting the frame to the towing vehicle for supporting the frame with one of the lateral faces downward.

12. A device of the class described adapted to be attached to a towing vehicle comprising an adjustable frame, wheels for supporting said adjustable frame, a windlass mounted on the frame having a cable adapted to be attached to the disabled vehicle for lifting the same, and means pivotally mounted on the frame adapted to be attached to the disabled vehicle for steadying the same in elevated position.

13. A device of the class described comprising an adjustable frame, a windlass mounted thereon having a cable adapted to be attached to the disabled vehicle for lifting the same, means mounted on the frame adapted to be attached to the disabled vehicle for steadying the same in elevated position, and mechanism for adjusting said means vertically.

14. A device of the class described comprising an adjustable frame, a windlass mounted thereon having a cable adapted to be attached to the disabled vehicle for lifting the same, towing bars pivotally mounted on the frame adapted to be attached to the disabled vehicle on opposite sides of the longitudinal axis thereof, and mechanism for adjusting said towing bars vertically.

15. A device of the class described comprising an adjustable frame, a windlass mounted thereon having a cable adapted to be attached to the disabled vehicle for lifting the same, a bracket slidably mounted on the frame, towing bars pivotally mounted on said bracket adapted to be attached to the disabled vehicle, and means engaging said bracket for adjusting the vertical position thereof.

16. A device of the class described comprising a frame including a beam, means for adjustably connecting the side members of one face of the frame to said beam, a windlass mounted on said beam, a pulley at one end of said beam over which the cable of said windlass is adapted to pass, means at the other end of the beam for detachably connecting said frame to the towing vehicle and a bracket secured to the beam for maintaining said means clear of the ground when the device is in towing or wrecking position, said bracket being adapted to support a pulley when the frame is in hoisting position.

17. A device of the class described comprising an adjustable frame, having a pair of supporting wheels, means carried by the frame for lifting one end of a disabled vehicle off the ground, and mechanism for adjusting the frame whereby when the load is supported by the frame, the latter may be adjusted to bring the supporting wheels substantially under the center of gravity of the loaded frame.

18. A device of the class described, comprising an adjustable frame having pairs of supporting wheels, means for suspending a load from said frame, mechanism for adjusting the frame so as to bring the suspending means into a balanced position above said wheels, and means for maintaining the said mechanism in adjusted position.

19. A device of the class described, comprising an axle, a triangular frame pivotally mounted on said axle, brackets secured to said axle adjacent said pivotally mounted frame, a second triangular frame having the side members thereof secured at one end to said brackets, an angle connecting the side members of said second frame, a T-member pivotally mounted to said axle at one end and secured at the other end to said angle, means connecting the apex ends of said triangular frames, brackets secured to said T-member and clampably fixed to said axle, and wheels mounted on said axle adjacent the outboard side of said brackets.

20. A device of the class described comprising an axle having a pair of wheels mounted thereon, a frame adapted, when in towing position, to be supported on said wheels, means for detachably connecting said frame to the towing vehicle, and an auxiliary wheel carried by the frame and normally inoperative when the frame is in towing position but adapted in conjunction with said pair of wheels, to support the frame in hoisting position.

21. A device of the class described comprising an axle having a pair of wheels mounted thereon, a frame adapted, when in towing position, to be supported on said wheels, means for detachably connecting said frame to the towing vehicle, an auxiliary wheel pivotally carried by the frame and normally inoperative when the frame is in towing position but adapted, in conjunction with said pair of wheels, to support the frame in hoisting position, and a windlass mounted on said frame having a cable provided with a hook at one end, said auxiliary wheel having apertures formed therein for receiving said hook.

22. A device of the class described comprising an axle having a pair of wheels thereon, a frame mounted on said axle, an auxiliary wheel pivotally carried by the frame adapted, in conjunction with said pair of wheels, to support the frame in hoisting position, a bracket secured to the frame adapted to support a pulley when the frame is in hoisting position, a rod pivotally secured to the frame for conveniently moving the same, and a windlass mounted on the frame having a cable adapted to pass over said pulley, said rod having a hook-shaped handle adapted to engage the cable when the frame is in towing position.

23. A device of the class described comprising an axle having a pair of wheels thereon, an adjustable frame mounted on the axle, means carried by the frame for elevating one end of a disabled vehicle, towing bars pivotally mounted on the frame including chains for engaging the vehicle and devices for locking the chains in said engaging relation, said towing bars being locked to the frame in inoperative position by said chains and locking devices when the frame is not in towing position.

24. A device of the class described comprising an axle having a pair of wheels thereon, an adjustable frame mounted on the axle, means carried by the frame for elevating one end of a disabled vehicle, longitudinally adjustable towing bars pivotally mounted on the frame, and means for adjusting the vertical position of said towing bars.

25. A device of the class described, comprising an axle having wheels thereon, frames mounted on said axle, a beam pivotally connected to the end of one of said frames, one end of the other of said frames being adjustably connected to said beam.

26. A device adapted to be attached to a towing vehicle, comprising an axle having wheels thereon, frames pivotally mounted on said axle, a beam pivoted to one of said frames and adjustably connected to the free end of the other frame, and means on said beam for attaching a vehicle to be towed and to elevate one end thereof off the ground.

27. A device adapted to be attached to a towing vehicle, comprising an axle having wheels thereon, frames pivotally mounted on said axle, a beam pivoted to one of said frames and adjustably connected to the free end of the other frame, means on said beam for attaching a vehicle to be towed and to elevate one end thereof off the ground, and means for holding said vehicle in spaced relation to said device.

28. A device adapted to be attached to a towing vehicle, comprising an axle having wheels thereon, frames pivotally mounted on said axle, a beam pivoted to one of said frames and adjustably connected to the free end of the other frame, means on said beam for attaching a vehicle to be towed and to elevate one end thereof off the ground, and pivoted means for holding said vehicle in spaced relation to said device.

29. A device for towing vehicles, comprising an axle having wheels thereon, frame members on said axle, means on said frame for raising one end of the towed vehicle off the ground, and pivoted means for steadying and holding said towed vehicle in spaced relation to said device.

30. A device for towing vehicles, comprising a towing vehicle, means on said vehicle for elevating one end of a towed vehicle off the ground, and vertically adjustable means for spacing said towed vehicle from said towing vehicle.

31. A device for towing vehicles, comprising a towing vehicle, means on said vehicle for elevating one end of a towed vehicle off the ground, and pivoted vertically adjustable means for spacing said towed vehicle from said towing vehicle.

32. A device of the class described, comprising a frame mounted on wheels, flexible means on said frame for maintaining one end of a disabled vehicle in elevated position, and pivoted means for holding said disabled vehicle out of contact with said frame.

In testimony whereof I have hereunto set my hand in presence of two subscribing witnesses.

ERNEST HOLMES.

Witnesses:
S. BARTOW STRANG,
WILLARD WARREN.